(12) United States Patent
Goldberg et al.

(10) Patent No.: US 10,614,179 B2
(45) Date of Patent: Apr. 7, 2020

(54) METHOD FOR AUTOMATING FULL-SCALE TEMPLATES FOR POSITIONING AUDIO/VIDEO COMPONENTS

(71) Applicants: Daniel Goldberg, Parrish, FL (US); Christopher Hetherington, Drexel Hill, PA (US)

(72) Inventors: Daniel Goldberg, Parrish, FL (US); Christopher Hetherington, Drexel Hill, PA (US)

( * ) Notice: Subject to any disclaimer, the term of this patent is extended or adjusted under 35 U.S.C. 154(b) by 190 days.

(21) Appl. No.: 15/397,235

(22) Filed: Jan. 3, 2017

(65) Prior Publication Data
US 2017/0193135 A1      Jul. 6, 2017

Related U.S. Application Data

(60) Provisional application No. 62/387,673, filed on Jan. 2, 2016.

(51) Int. Cl.
| | |
|---|---|
| G06F 17/50 | (2006.01) |
| E04C 3/08 | (2006.01) |
| E04C 3/04 | (2006.01) |

(52) U.S. Cl.
CPC .......... *G06F 17/5004* (2013.01); *E04C 3/08* (2013.01); *E04C 2003/0495* (2013.01); *G06F 2217/12* (2013.01)

(58) Field of Classification Search
None
See application file for complete search history.

(56) References Cited

PUBLICATIONS

Thomasthomasthomas, "Truss Tape Demo", published Feb. 18, 2015, 21:28 minutes, 8 pages of screenshots, Accessed at https://www.youtube.com/watch?v=apHV2GLsGds.*

\* cited by examiner

*Primary Examiner* — Suzanne Lo
(74) *Attorney, Agent, or Firm* — Chalin A. Smith; Smith Patent, LLC (57) ABSTRACT

Described herein is a method for generating a full-scale template that allows for the precise positioning of audio and/or video (A/V) components, such as lighting, video and sound devices, onto an elongate structural member, such as a truss, in order to create a desired environment for a staged event.

9 Claims, 6 Drawing Sheets

METHOD FOR AUTOMATING FULL-SCALE TEMPLATES FOR POSITIONING AUDIO/VIDEO COMPONENTS

PRIORITY

This application claims the benefit of U.S. Provisional Application Ser. No. 62/387,673, filed Jan. 2, 2016, the entire contents of which are incorporated by reference herein.

FIELD OF THE INVENTION

The present invention relates generally to the field of staged event rigging and is particularly directed to an efficient method for generating a full-scale template that allows for the precise positioning of audio/video (A/V) components, such as lighting, video and sound devices, onto an elongate structural member, such as a truss, in order to create a desired environment for a staged event.

BACKGROUND

The success of a staged event depends heavily on creating the proper environment for the performers. It is necessary that performers be provided with an environment suited to their requirements. It is also necessary to create an environment that meets the requirements of the audience, both those present at a live performance, and those viewing and/or listening to the performance via electronic media, either as a live stream or recording. A complex system of lighting, audio and video devices and equipment is assembled at the venue to satisfy these requirements. Many of these components are mounted on a structure that may be suspended above the stage via cables attached to the structure of the facility housing the event, or to a free standing structure created for that purpose.

Designing and assembling the complex system of audio/video (A/V) components required to provide a suitable environment is accomplished in the following manner. The requirements for the particular event are determined and a plan of the site is created, generally using a Computer Aided Design (CAD) program. Typical of such programs is Vectorworks by Nemetchek Software (Munich, Germany). After the ground plan is created, the rigging points are located within the structure to which the suspending cables will be attached. Based on this information and the site plan, a system of truss assemblies is designed and added to the plan. Thereafter, lighting designers, audio technicians and video designers each determine their requirements and the locations for lighting units, audio speakers and video equipment (e.g., projectors, Light Emitting Diode (LED) screens, projection screens and the like) on the truss structure. The assembled equipment placement information is input to the CAD program, including for each device its type, circuit number, address and any other necessary information. Thereafter, detailed drawings and weight information are created and provided to the riggers responsible for suspending the truss structure for review and approval. Following approval, the detailed plan is given to the crew that will be constructing the truss structure and locating equipment on the trusses.

Truss assemblies are elongate structures on which various lighting, sound and video devices must be precisely located and positioned. Positioning such components on a truss assembly is accomplished using an elongate template (commonly referred to as a "truss tape") on which the locations and types of devices are indicated. After the specified devices are mounted on the trusses and tested, the trusses are suspended at the proper height above the stage in preparation for the event.

At present, the elongate templates used to locate A/V components on a truss are created manually. Namely, the component specifications are printed on stickers that are manually applied to the elongate medium, with locations determined using measuring tapes. Elongate media frequently used include, but are not limited to drywall tape, polymeric barrier tapes commonly used for limiting access or posting warnings, or woven polymeric web material.

Preparing these elongate templates is both time-consuming and prone to errors, since the templates are created manually from written materials. Errors in the location or in the equipment specified may lead to significant delays, particularly if the errors are discovered after the truss assembly is suspended to its final height prior to discovering the error. Accordingly, there is a need in the art for a more precise method for positioning A/V components on an elongate structure, such as a truss, that utilizes a printer-generated, full-scale detailed schematic, thereby eliminating the requirement for manually producing elongate templates or "truss tapes" along with the time and errors associated therewith.

SUMMARY OF THE INVENTION

Further to the above-noted need in the art, it is accordingly an objective of the present invention to provide an improved method for precisely indicating the type and position of various A/V components that are to be mounted on a truss that are integral to a staged environment. More particularly, the present invention provides a printer-generated, full-scale elongate template that (a) specifies the type and location of the A/V components to be mounted on a truss and (b) is produced directly from information within a CAD-generated source file. In a preferred embodiment, the improved method includes the following steps:
 (a) Providing a computer-generated source file, typically a CAD file, that comprises a detailed plan for truss construction as well as details regarding the location and specification for each of the various A/V components to be attached thereto;
 (b) Inputting the computer-generated source file from step (a) into a translation program, wherein the translation program converts the source file into a full-scale schematic that may be output to a printer;
Optional additional steps include:
 (c) outputting the full-scale schematic generated in step (b) to a printer so as to automatically create one or more elongate templates that indicate the specification and the precise location for each of the A/V components to be mounted thereon in full-scale detail;
 (d) aligning each of said one or more elongate templates onto a corresponding truss assembly;
 (e) mounting to the truss assembly at the location(s) indicated by the template each of the A/V components specified for the particular location.

In an alternate embodiment, the method of the present invention includes the following steps:
 (a) providing a first computer program, such as a CAD program, suitable for creating a detailed plan for truss construction and for the A/V components to be used, along with their locations on the truss construction and any other required information;

(b) providing a second computer program that can receive a source file containing truss construction and A/V component information from a CAD program, to process the information contained in the source file, and to create an output file configured for transmitting to a printer digital information that allows the printer to generate one or more full-scale elongate templates (i.e., "truss tapes") that indicate the A/V component specification(s) and the location(s) on the truss(es) associated therewith as specified in the CAD program;

(c) providing a printer suitable for producing elongate printouts;

(d) inputting detailed information for truss construction and for the select A/V component to be attached thereto into the first computer program of step (a);

(e) outputting a source file containing a detailed plan for truss construction and A/V component selection and positioning from the first computer program;

(f) inputting the source file from step (e) into the second computer program of step (b), wherein said second computer program converts the information from the source file into a full-scale schematic that can be transmitted to a printer;

(g) Transmitting the information from the second computer program to a printer capable of generating an elongate template for each truss assembly, wherein at each location that a component is to be mounted, a description of the component with relevant information as specified in the computer program is printed;

(h) positioning each template on its corresponding truss assembly; and, (i) mounting to the truss at the locations specified by the elongate template, the components and associated hardware specified by the template.

In a preferred embodiment, the second computer program includes a means for scaling the output to the printer so that the printer may be calibrated to the configuration specified.

In certain embodiments, the second computer program may be a stand alone system, an addition to an existing first computer program (such as a conventional CAD program), or alternatively be integrated with a CAD program.

The objectives, aspects and features of the invention discussed herein above will become more fully apparent when the following detailed description is read in conjunction with the accompanying figures and/or examples. However, it is to be understood that both the foregoing summary of the invention and the following detailed description are of preferred embodiments and not restrictive of the invention or other alternate embodiments of the invention. Various modifications and applications may occur to those who are skilled in the art, without departing from the spirit and the scope of the invention, as described by the appended claims. Likewise, other objectives, features, benefits and advantages of the present invention will be apparent from this summary and certain embodiments described below, and will be readily apparent to those skilled in the art having knowledge in the computer and CAD design arts. Such objectives, features, benefits and advantages apparent from the above in conjunction with the accompanying examples, data, figures and all reasonable inferences to be drawn there-from are specifically incorporated herein.

BRIEF DESCRIPTION OF THE FIGURES

Various aspects and applications of the present invention will become apparent to the skilled artisan upon consideration of the brief description of the figures and the detailed description of the present invention and its preferred embodiments that follows.

DETAILED DESCRIPTION OF THE PREFERRED EMBODIMENTS

The present invention is directed to a method for generating via a printer one or more full-scale elongate templates that (a) specify the precise type and location of each A/V component to be mounted on a truss and (b) are produced directly from information within a computer-generated source file, such as a CAD file.

Construction and utilization of the instant invention is best understood through the following text and associated figures. However, before the present materials and methods are described, it is to be understood that the present invention is not limited to the particular materials, methodologies or protocols herein described, as these may vary in accordance with routine experimentation and optimization. It is also to be understood that the terminology used in the description is for the purpose of describing the particular versions or embodiments only, and is not intended to limit the scope of the present invention which will be limited only by the appended claims.

Unless otherwise defined, all technical and scientific terms used herein have the same meaning as commonly understood by one of ordinary skill in the art to which this invention belongs. In case of conflict, the present specification, including following definitions, will control.

The words "a", "an", and "the" as used herein mean "at least one" unless otherwise specifically indicated.

In the context of the present invention, the term "proximal" is used to refer to an end, portion, or direction that is situated closest to or points to the user. In contrast, the term "distal" is used to refer to that end, portion, or direction that is situated farthest away or points away from the user.

In the context of the present invention, the terms "axial" and "longitudinal" are used to refer to travel along a long axis of a body, i.e., a lengthwise direction or dimension. In contrast, the term "lateral" is used herein to refer to travel perpendicular or transverse to a long axis of the body, i.e., a side-to-side direction or dimension.

In the context of the present invention, the term "radial" is used to refer to the direction that extends outward from the center of a circular or tubular structure or inward from the circumference inward along a radius.

The present invention makes reference to "audio/video (A/V) components", a generic term used herein to encompass any of a number of sound, lighting, and video devices, from speakers to spotlights to projection screens.

The present invention makes reference to "truss" and "truss assemblies", terms interchangeably used herein to refer to a framework, typically consisting of rafters, posts, and struts, supporting a roof, bridge, or other structure. In the context of the present invention, truss assemblies are the generally elongate structures on which various A/V components, such as lighting, sound and video devices, must be precisely located. The precise truss construction is not critical to the present invention; as such, supporting horizontal and vertical trusses as well as circular and diagonal trusses, among others, are contemplated by the present invention.

In the context of the present invention, the term "truss tape" is used to refer to the elongate template commonly used in the art to position various A/V components on a truss assembly, on which the location(s) and specification(s) of each component is indicated. Elongate mediums frequently used include, but are not limited to drywall tape, polymeric barrier tapes commonly used for limiting access or posting warnings, or woven polymeric web material.

The present invention makes reference to the generation of "full-scale" templates that find utility in precisely and accurately positioning various A/V components on a designated truss assembly. In the context of the present invention, the term "full-scale" implies a one-to-one ratio with the final product, i.e., a template that is the same size as the truss itself. As such, no further scaling, adjustment or measurement is required prior to mounting.

In the context of the present invention, the phrase "Computer-aided design" or "CAD" is used to refer to the computer systems that aid in the creation, modification, analysis, or optimization of a design. CAD software is conventional in the art and is used to increase the productivity of the designer, improve the quality of design, improve communications through documentation, and to create a database for manufacturing. CAD output is often in the form of electronic files for print, machining, or other manufacturing operations. In the context of the present invention, CAD software is used generate a source file containing a detailed plan for truss construction as well as the details regarding the location and specification for each of the various A/V components to be attached thereto.

Although any methods and materials similar or equivalent to those described herein can be used in the practice or testing of embodiments of the present invention, the preferred methods, devices, and materials are now described in greater detail by reference to the exemplary embodiments. However, the following examples only illustrate aspects of the invention and in no way are intended to limit the scope of the present invention. As such, embodiments similar or equivalent to those described herein can be used in the practice or testing of the present invention.

Examples

Figure 1:
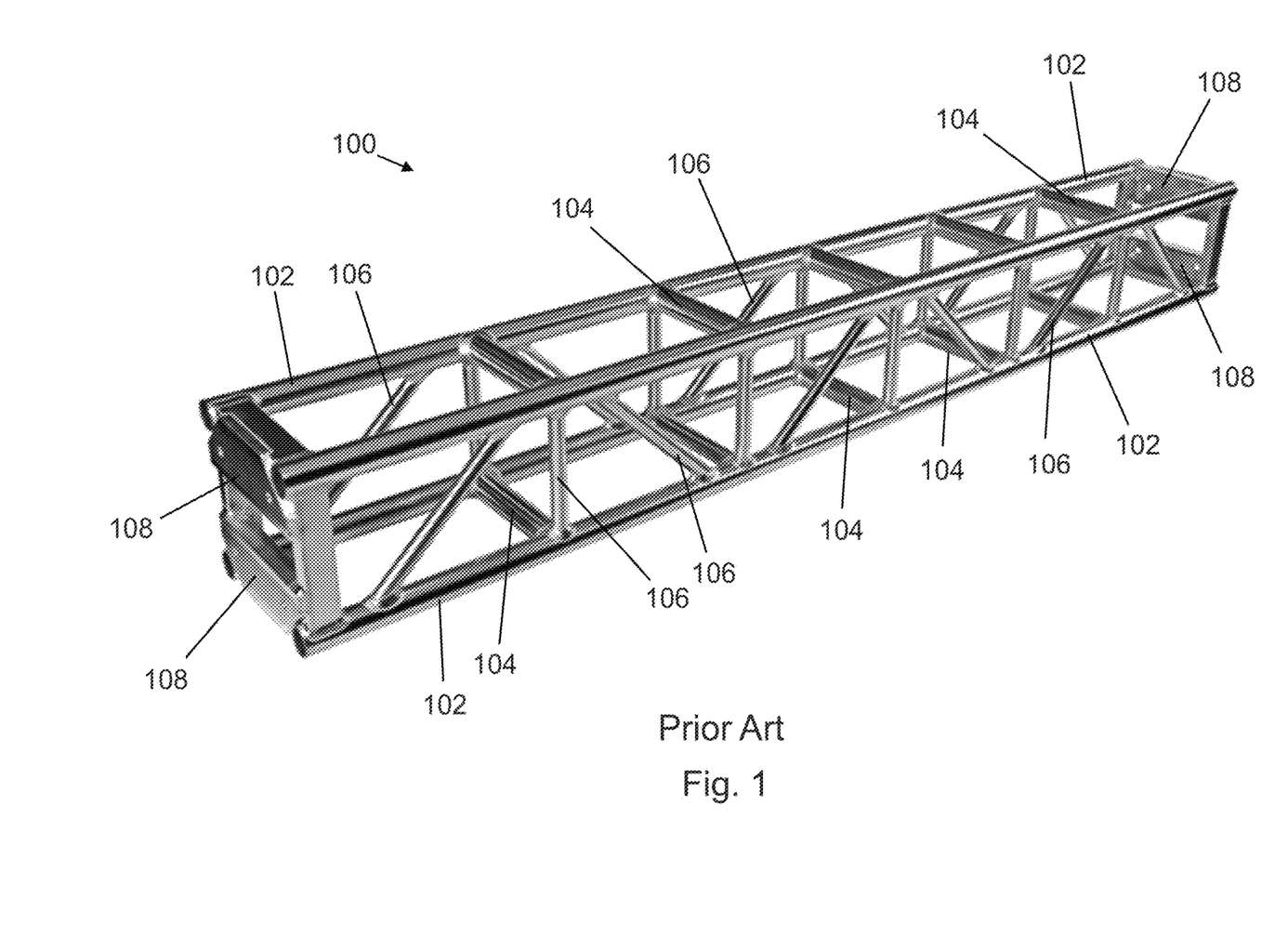
FIG. 1 is a perspective view of a truss segment.

FIG. 1 depicts a truss segment 100 commonly used for positioning sound, video and lighting devices (i.e., "A/V components") for a staged event. Truss segment 100 is formed of welded tubular and plate components comprising elongate, axially extending, horizontal elements 102, and laterally extending horizontal elements 104 which join pairs of axially extending elements 102. Vertical and angled elements 106 join pairs of axially extending elements 102. Truss segment 100 has positioned at its ends plates 108 in which are formed holes which allow the joining of segments 100 to make truss assemblies of extended lengths. Truss segment 100 is of conventional design and does not form a part of the present invention.

Figure 2:
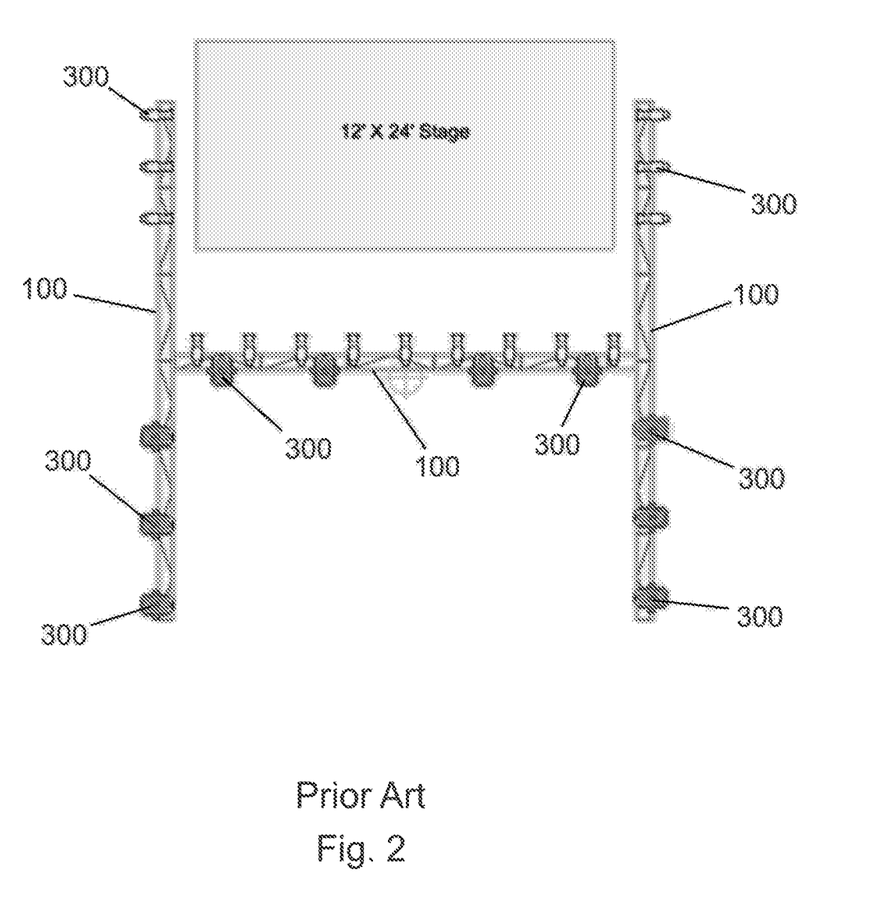
FIG. 2 is a printout of a site plan for positioning a truss assembly and devices to be mounted thereto.

Referring now to FIG. 2, truss segments 100 are joined to create a structure specified in plan 200 that is created using a suitable first (CAD) program using inputs received from lighting designers, audio technicians and video designers. Plan 200 specifies the locations for devices 300 including, for instance, lighting units, audio speakers and video equipment (projectors, Light Emitting Diode (LED) screens and projection screens) on the truss structure formed of truss segments 100. Creation of plan 200 is performed in a conventional manner and is not considered to be an essential part of the present invention.

Figure 3:
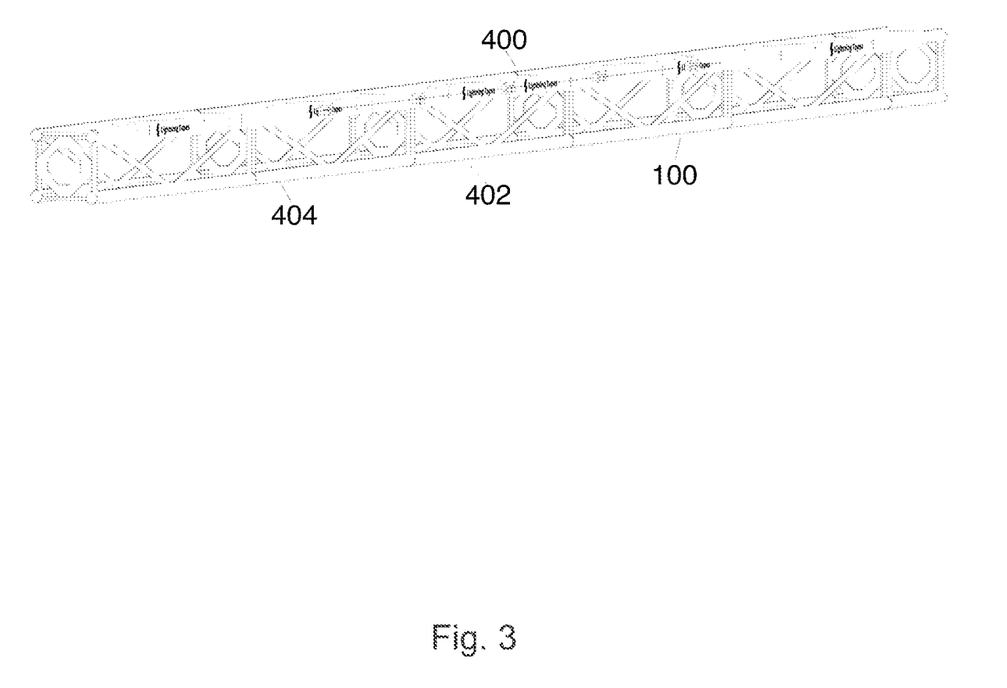
FIG. 3 is a perspective view of an elongate template produced and in use in accordance with the principles of the present invention.
Figure 4:
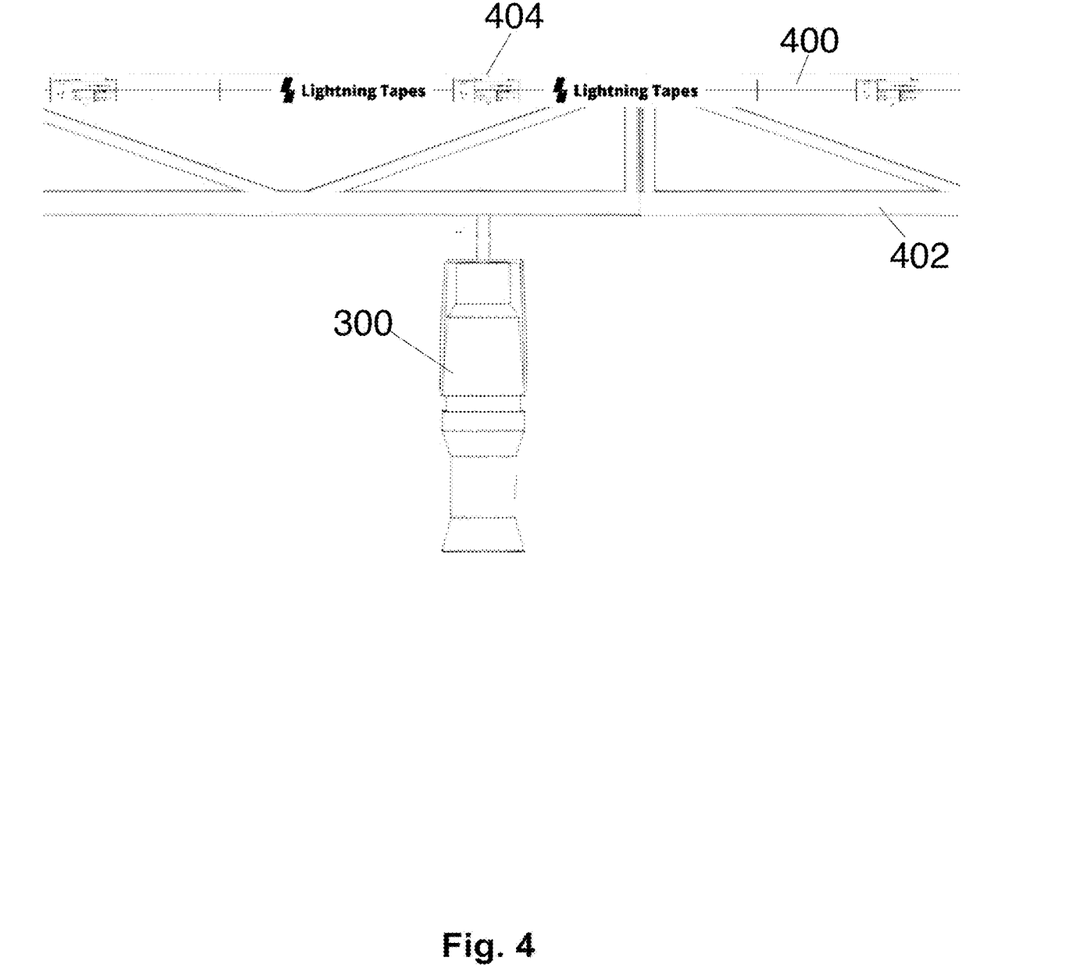
FIG. 4 is a side elevational view of a portion of the objects of FIG. 3 depicting a device located and mounted on a truss in accordance with the method of the present invention.

Thereafter, in accordance with principles of the present invention, truss and device information from a first conventional program is transmitted to a second computer program wherein data imported from the CAD program is displayed and additional required information for each device 300 is specified. This information may include, for example, the unit type, circuit number and address and such other information as will ensure that the proper unit, properly oriented and properly connected to the system, will be positioned in the proper location. The second computer program acts as a translator, converting the data that was input into the first computer program (and from which a "source file" is generated) into a full-scale print-out that may be mounted to the elongate truss assembly. In this manner, the source file information is formatted for creation of one or more elongate full-scale templates ("truss tapes") on which the specified information for each device on each elongate truss assembly is indicated at precise and accurately spaced location(s) at which each device is to be mounted. FIG. 3 depicts a truss tape 400 of the present invention positioned on an elongate truss assembly 402 formed of truss segments 100. Indicia 404 indicate at each location that a device is to be mounted the information required to uniquely specify that device and how it is to be connected to the system. FIG. 4 depicts a device 300 mounted to truss assembly 402 according to the principles of the present invention wherein the location and device specification have been directly printed on elongate template 400 using a computer program and methods of the present invention.

Figure 5:
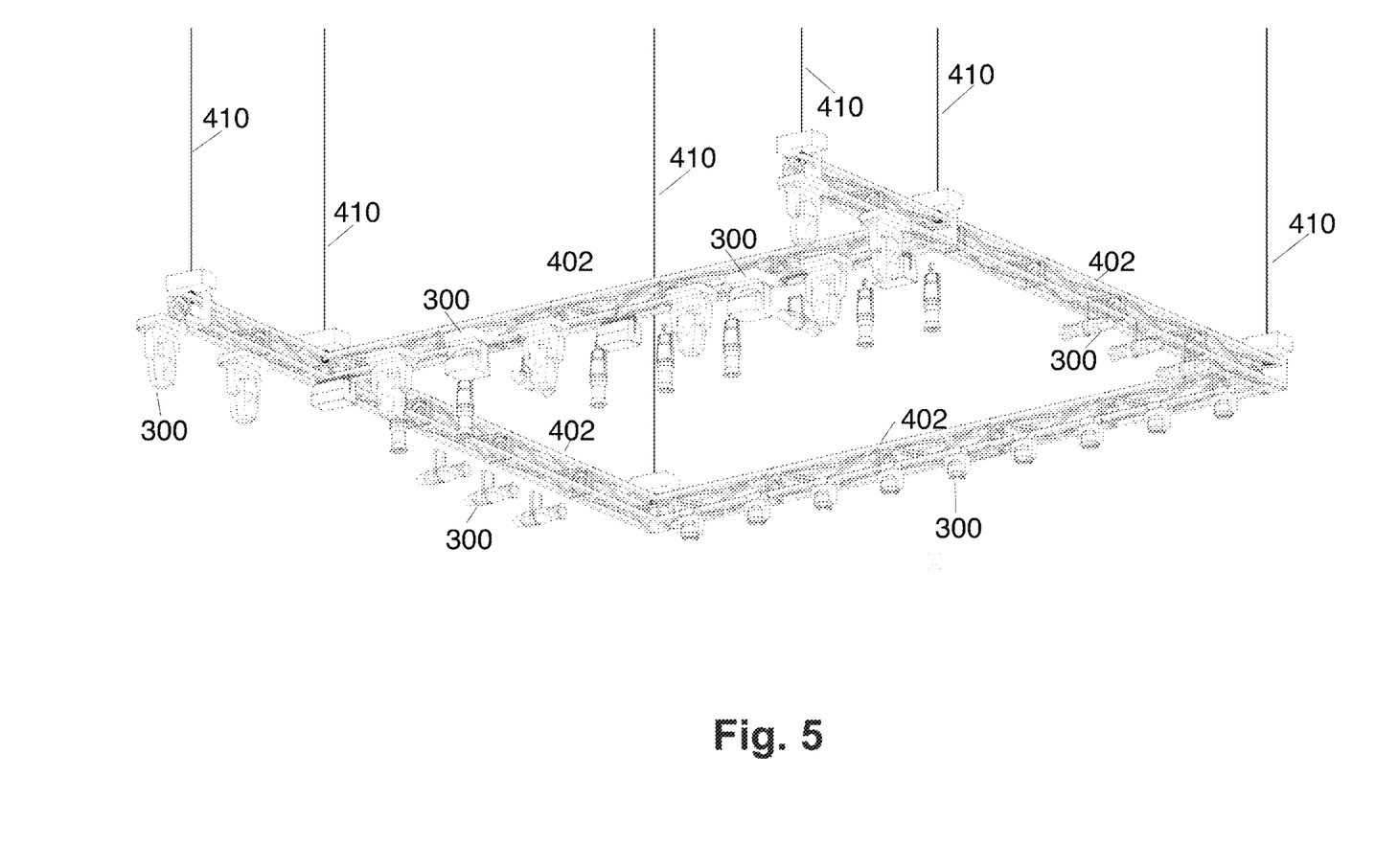
FIG. 5 is a perspective view of a truss structure and associated devices assembled in preparation for elevation to its level for use.

Thereafter, preparation the site occurs in the usual manner, FIG. 5 depicting a completed truss construction ready for elevating to its final position using cables 410.

Figure 6:
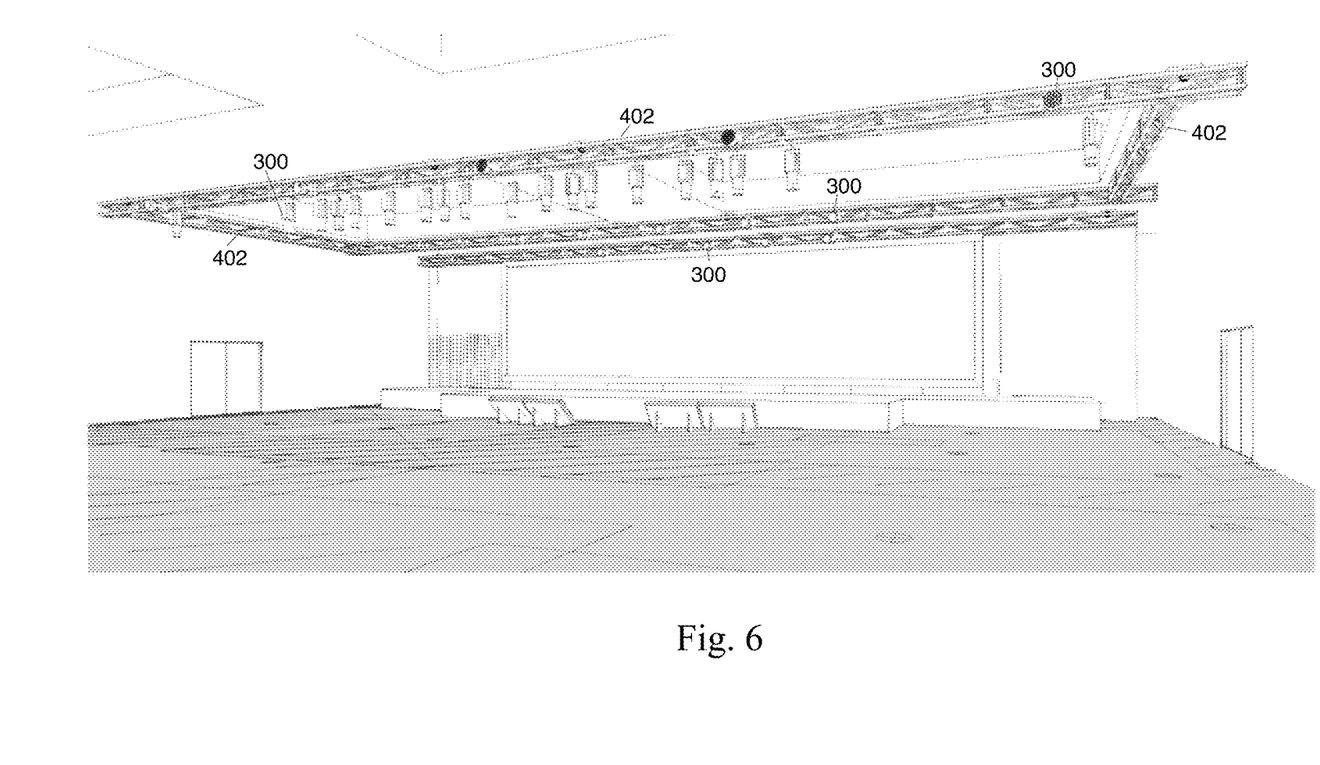
FIG. 6 is a perspective view of a truss structure and associated devices positioned for use.

FIG. 6 depicts a truss assembly 402 with its associated devices 300 suspended in its final position in preparation for use.

INDUSTRIAL APPLICABILITY

The methods of the present invention provide a full scale "truss tape" created directly from digital information using a calibrated printer; accordingly, human errors that may occur during the manual preparation of the tape are eliminated. Although the completed assembly is tested prior to elevating it to its final position, errors in device placement or connection due to errors in creating the truss tape may not be discovered until the structure is elevated. Correcting such errors on an elevated structure is difficult. The elimination of such errors is a principal benefit of the method of the present invention. Additionally, the elimination of manual truss tape preparation results in significant time and cost savings.

All patents and publications mentioned herein are incorporated by reference in their entirety. Nothing herein is to be construed as an admission that the invention is not entitled to antedate such disclosure by virtue of prior invention.

While the invention has been described in detail and with reference to specific embodiments thereof, it is to be understood that the foregoing description is exemplary and explanatory in nature and is intended to illustrate the invention and its preferred embodiments. Through routine experimentation, one skilled in the art will readily recognize that various changes and modifications can be made therein without departing from the spirit and scope of the invention. Such other advantages and features will become apparent from the claims filed hereafter, with the scope of such claims to be determined by their reasonable equivalents, as would be understood by those skilled in the art. Thus, the invention is defined not by the above description, but by the following claims and their equivalents.

What is claimed:

1. A method for automating the generation of a full-scale schematic for locating, positioning, and mounting a plurality of audio/video (A/V) components to an elongate truss assembly, said method comprising the steps of:
   a. providing a computer-generated source file containing digital data representing a plan for the construction of said truss assembly including the specification, location, and position for each of said plurality of A/V components to be mounted thereto; and
   b. electronically transmitting the entirety of said computer-generated source file from step (a) to a translation program and
   c. by means of said translation program, instantly converting the digital data in the source file representing said plan into a full-scale schematic in a format suitable for direct output to a printer.

2. The method of claim 1, further comprising the step of outputting the full-scale schematic generated in step (c) to a printer so as to automatically create one or more elongate full-scale templates that indicate the specification, position, and the precise location for each of said plurality of A/V components to be mounted to said truss assembly in full-scale detail.

3. The method of claim 2, further comprising the step of aligning each of said one or more elongate full-scale templates onto a corresponding portion of said truss assembly.

4. The method of claim 2, further comprising the step of positioning to the truss assembly at the location(s) indicated by the one or more elongate full-scale templates each of said plurality of A/V components specified for the particular location.

5. A method for automating the generation of a full-scale schematic for locating, positioning, and mounting a plurality of audio/video (A/V) components to an elongate truss assembly, said method comprising the steps of:
   d. providing a first computer program suitable for creating a digital representation of a plan for construction of said truss assembly including the specification, location, and position for each of said plurality of A/V components to be mounted thereto;
   e. providing a second computer program that can import or receive a source file from said first computer program that contains said digital representation and can generate therefrom a full-scale schematic in a format suitable for direct output to a printer;
   f. providing a printer suitable for producing elongate printouts;
   g. inputting into said first computer program of step (a) instructions for the construction of said truss assembly and for the selection, location, and position of each of said A/V components to be mounted thereto;
   h. outputting from said first computer program a source file containing a digital representation of said instructions for truss construction and A/V component selection, location, and position input in step (d);
   i. electronically transmitting the entirety of said source file from step (e) to the second computer program of step (b), wherein said second computer program instantly converts said digital representation into a full-scale schematic that can be directly output to a printer;
   j. directly transmitting said full-scale schematic generated by said second computer program to the printer of step (c) and generating by means of said printer one or more elongate full-scale print-outs contained in said schematic for attachment to said truss assembly, wherein at each location that an A/V component is to be mounted, a description of the component with relevant information as specified in the computer program is printed;
   k. positioning each of said one or more elongate full-scale print-outs generated in step (g) onto a corresponding portion of said truss assembly; and,
   l. positioning onto the truss assembly at the locations specified by the one or more elongate full-scale print-outs the A/V components and associated hardware specified by said template.

6. The method of claim 5, wherein said second computer program is integrated with said first computer program.

7. The method of claim 5 wherein said second computer program is an add-on that cooperates with said first computer program.

8. The method of claim 5 wherein said first computer program is a CAD program.

9. The method of claim 5, wherein said one or more full-scale print-outs comprise truss tapes.

* * * * *